United States Patent [19]

Bondi

[11] 4,038,094

[45] July 26, 1977

[54] MOLDING COMPOSITION

[76] Inventor: Herman H. Bondi, 1224 SE. Henry, Portland, Oreg. 97202

[21] Appl. No.: 673,667

[22] Filed: Apr. 5, 1976

Related U.S. Application Data

[60] Continuation-in-part of Ser. No. 632,669, Nov. 17, 1975, abandoned, which is a division of Ser. No. 492,473, July 29, 1974, abandoned.

[51] Int. Cl.² ............................................. C04B 7/02
[52] U.S. Cl. ........................................ 106/99; 106/109; 106/110
[58] Field of Search ................... 106/98, 99, 110, 109

[56] References Cited

U.S. PATENT DOCUMENTS

| | | | |
|---|---|---|---|
| 1,432,545 | 10/1922 | Gilbert | 106/98 |
| 2,509,599 | 5/1950 | Hollenberg | 106/99 |
| 3,232,778 | 2/1966 | Dean | 106/110 |
| 3,582,376 | 6/1971 | Ames | 106/110 |
| 3,847,635 | 11/1974 | Lange et al. | 106/110 |
| 3,852,081 | 12/1974 | Lehman | 106/110 |

*Primary Examiner*—J. Poer
*Attorney, Agent, or Firm*—Chernoff & Vilhauer

[57] ABSTRACT

A molding composition, made of earth products, which is particularly suitable for producing urns and frames for mausoleum niches and other decorative articles. In its dry state the molding composition is made of about 1¼ parts by volume standard casting plaster, 1 part by volume Portland cement and ⅛ part by volume sand. Preferably about 0.5-2 parts by volume fiberglass fibers are also added to the molding composition. The dry composition is mixed with about 1¼ parts by volume of water, enough to produce a standard 7 inch slump, and placed in a mold having the shape of the decorative article to be produced where it is allowed to set.

4 Claims, No Drawings

MOLDING COMPOSITION

Cross-Referece to Other Application

This appliction is a continuation-in-part of my co-pending application Ser. No. 632,669, filed Nov. 17, 1975, now abondoned, which is incorporated herein by reference, which is a division of applicatio Ser. No. 492,473, filed July 29, 1974, now abandoned.

BACKGROUND OF THE INVENTION

This invention relates to a new molding composition which is particularly suitable for use in the manufacture of urns and decorative frames for mausoleum niches, picture frames and oher durable articles of an ornamental or sculptural nature.

Modern mausoleums are constructed with hundreds of small niches or hollow cavities formed in their interior walls adapted to house urns containing cremated ashes of the dead, and framed by rectangular decorative frames mounted around the fronts thereof for holding glass so that the urns can be concurrently viewed while protected. Once installed, the frames and urns remain permanently in place. A metal, usually brass, is used extensively in making such frames and urns because they must be long-lasting, must have a decorative and durable appearance, must be made of a hard and strong material capable of being molded with intricate sculptural designs having sharp, clean surfaces and edges, and must not be susceptible to cracking or chipping over an extended period of time. However, rising costs and the shortage of brass or other suitable metals makes it very desirable that a more available material be found for such frames and urns, and for other ornamental articles such as picture frames, decorative borders, and the like which require similar strength, durability, moldability and appearance characteristics.

One possible group of substitute materials are plastics. However plastic materials, in their presently available form, are unsuitable for the foregoing applications because, while they can be exceptionally hard and strong, they have an easily detectable synthetic, nondurable appearance which is not desirable for use in mausoleums and other artistic applications where a long-lasting, substantial appearance is required.

Another possible substitute group of materials are earth products, particularly combinations of Portland cement, plaster of Paris (i.e. calcined gypsum and lime) and sand which, when mixed with water and allowed to set in a mold, form a hard casting having the shape of the mold. Combinations of such materials have previously been used for various purposes such as producing building blocks, artificial stone and dental investment. For example, Hansen U.S. Pat. No. 1,923,370 discloses the use of 5-95% calcined gypsum ($CaSO_4 \cdot \frac{1}{2}H_2O$) with 95-5% Portland cement to produce building blocks of various shapes which are particularly resistant to eroding action by water. Comins U.S. Pat. 218,490 discloses the use of equal parts of plaster of Paris, cement and sand, along with wood ashes and common salt, which may be used to produce aritficial stone. Similarly, Gilbert U.S. Pat. No. 1,432,545 shows the use of one part dental plaster of Paris, three parts Portland cement and two parts silica (presumably silicon dioxide, the essential ingredient of sand). However, none of the aforementioned combinations of ingredients provides the combination of sufficient strength, durability, hardness, resistance to chipping and sculptural moldability qualities necessary for the production of the aforementioned types of ornamental articles.

Three factors which are of particular importance in governing the strength and sculptural qualities of an article molded from the aforementioned components are the type of plaster utilized, the amounts of plaster and cement relative to one another, and the amount of sand relative to the plaster and cement. It has been found that the use of mere plaster of Paris, that is, conventional coarse-ground calcined gypsum mixed with lime and setting retardation agents, results in a molded product of only moderate strength and unsatisfactory sculptural definition and sharpness. It has also been found that the strength of the product is reduced significantly and the setting time is increased significantly if an insufficient amount of calcined gypsum relative to Portland cement is used. In addition, the strength and sculptural quality of the product is seriously degraded if too much sand relative to the mixture of calcined gypsum and cement is used. Therefore, it can be seen that improvements in the character and relative quantities of the aforementioned components are needed if they are to be used in molding the aforementioned types of products which require high strength and durability, and exhibit good sculptural characteristics.

SUMMARY OF THE INVENTION

The present invention is directed to a specific molding composition comprising, in its dry form, about $1\frac{1}{4}$ parts by volume standard casting plaster, about 1 part by volume Portland cement and about $\frac{1}{8}$ part by volume of sand. Such specific composition has been found to possess the strength, hardness, durability, appearance and sculptural characteristics necessary to serve as an excellent basic construction material for the aforementioned ornamental articles of a sculptural nature, while compositions having significatly different proportions of the same ingredients and compositions utilizing common plaster of Paris rather than casting plaster, produce products of considerably and surprisingly lower quality.

While both common plaster of Paris and standard casting plaster contain the same basic chemical composition, that is, both contain calcium sulfate hemihydrate, standard casting plaster has a finer grain and is purer than common plaster of Paris, while plaster of Paris normally contains lime and a greater amount of additives for retarding the rate of setting to provide workability of the composition. Testing of articles produced in the aforementioned novel proportions using, alternatively, casting plaster and plaster of Paris, has demonstrated that the use of casting plaster results in a molded product having surprisingly over two and one-half times the compressive strength of an otherwise identical product produced using plaster of Paris. In addition, the casting plaster also results in a product having sharper sculptural characteristics, that is, greater definition of design at sharp corners and edges of a molded sculptural pattern.

It has also been found that sand utilized in the mixture at a higher proportion than that set forth above will reduce the compressive strength of the resultant product to a surprising degree, and degrade the sculptural characteristics and resistance to chipping at the edges of the product due to the tendency of the edges to crumble. Testing of a product produced with the specified proportion of sand relative to Portland cement and casting plaster, in comparison with an otherwise identical product produced with equal amounts of sand and Portland cement, specified proportion produces a product having nearly 70% higher compressive strength than the latter product, as well as sharper sculptural characteristics. Decreased strength also accompanies use of a significantly less proportion of sand than that specified.

The foregoing molding composition can be used in making sculptural articles by the following process: (1) mix the above dry ingredients with a sufficient amount of water to make a wet, moldable uniform mixture; (2) pour the wet molding mixture into a mold which preferably contains reinforcing rods; (3) permit the molding mixture to harden in the mold for at least 5 minutes and preferably 30 minutes; and (4) separate the hardened mixture from the mold. In addition, a water reducing agent may be added to facilitate the mixing of the composition, and fiberglass fibers are preferably added to the composition for increased integrity of the final molded product.

It is therefore a principal object of the present invention to provide a new and improved economical molding composition which can be used in the manufacture of strong, hard and durable sculptural articles of an ornamental nature.

The foregoing and other objects, featurs and advantages of the present invention will be more readily understood upon consideration of the following detailed description of the invention.

DETAILED DESCRIPTION OF THE PREFERRED EMBODIMENT

It is important to the present invention that the constituents utilize standard casting plaster (or calcined gypsum having comparable particle size and purity) rather than common plaster of Paris. Preferably the casting plaster used shold meet ASTM standard C 59-73 which requires at least 80% purity of calcined gypsum ($CaSO_4 \cdot \frac{1}{2}H_2O$) and a particle size fine enough that all pass a No. 30 (600-$\mu$m) sieve and at least 90% pass a No. 100 (150-$\mu$m) sieve.

The Portland cement and sand used herein can be from any commercially available source of these materials. The cement preferably conforms to ASTM c150 type III. It is preferable, but not critical, that white non-staining Portland cement and white sand be employed. It is particularly important that the sand be between 16-24 mesh (Tyler equivalents), and most preferably 20 mesh. Coarser or finer sand than this range will work, but with an accompanying reduction in the strength and durability of the resultant molded product and in its sculptural characteristics.

The particular proportios of casting plaster, Portland cement and sand in the molding composition are critical to the present invention. There must be about 1½ parts by volume of casting plaster; a lesser, about 1, part by volume Portland cement; and an even lesser, about ⅞, part by volume sand in a dry mixture before the addition of water thereto. Any substantial variance from these proportions will decrease considerably the strength and durability of the molded article, the capability of the composition to be molded into structural shapes having sufficiently clean-cut, will-defined surfaces and edges, and the molded article's resistance to chipping.

In the preferred embodiment of the present invention fiberglass fibers are added to the dry molding composition in proportins of 0.5-2 parts with respect to he above-stated proportions. If used, the fiberglass fibers should be about ⅜ inch in length in order to be uniformly and evenly distributed in random orientation in the molding composition and resultant product. The fiberglass binds the other ingredients more firmly together and further prevents the corners and edges of the molded articles from chipping, thereby rendering the composition more moldable and the resultant product more durable. It should be understood that while the use of such fibers is preferable, it is not critical to the present invention.

When the above molding composition is used to make a molded article, the dry ingredients are normally first mixed together so that a uniform and evenly dispersed mixture is formed. After the dry molding composition is formed it is mixed with a suitable amount of water in order to form a wet moldable mixture. Alternatively, mixing of the dry ingredients could be dispensed with and a uniform mixture obtained by mixing the ingredients in wet form during or after the addition of water. Any suitable apparatus can be used to perform the mixing. The amount of water should be sufficient to make the dry ingrediens moldable and allow them to harden when the water evaporates, but not of such an excess amount as to prevent the ingredients from quickly setting. Preferably a water reducing agent such as a triethanolamine salt of a sulfonated hydrocarbon, should be used to reduce the amount of water necessary to produce the required consistency. In addition, a liquid bonding agent for plaster and concrete such as a polyvinyl acetate should be added to the water in a volumetric ratio fo about 1:160 respectively to increase the adhesion of the sand to the plaster and cement. With the above-stated proportions of dry ingredients, and using such a water reducing agent, enough water should be added to the mixture to produce about a standard seven inch slump. When the aforementioned water reducing agent is combined with water in a volumetric ratio of 1:200 respectively, about 1¼ parts by volume of the resultant water mixture should be added to the above-stated parts of dry ingredients.

When molding rectangular niche frames, urns, picture frames or other ornamental articles of a sculptural nature, the wet mixture is poured into a conventional open mold in the shape of the desired article. Reinforcing bars may be placed in the mold before the wet moldable mixture is poured so that they are embedded therein and thereby increase the strenght of the finished product. Once the wet molding mixture has been introduced into the mold it should be allowed to harden for at least five minutes, although it is desirable that it remain in the mold for about 30 minutes to insure its final integrity upon separation from the mold.

The temperatures at which the molding composition ingredients are mixed and the molding process is performed are not critical, ordinarily room temerature being entirely satisfactory. Higher temperature will increase the speed at which the composition hardens, as is well known to those skilled in the art, and can be selected according to the desired objectives. After the mold has been removed the molded product is painted with a gold or brass colored paint to provide th finished appearance of the product which attractively resembles aged metal due to the natural texture of the molded composition. The molded product obtains full strength in about three days and until then should be handled carefully. The product is very strong and hard and can be drilled through without cracking or disturbing the other portions of the product. One of its important advantages over brass, inaddition to economy, is that it will not tarnish as brass does.

While the foregoing detailed description contemplates the use only of casting plaster, Portland cement, sand, fiberglass and a water reducing agent, it is recognized that some other materials conventionally used to make molded articles such as fillers, stabilizers, retarders and the like may be added, however only in such minor amounts as will not affect the aforementioned basic characteristics of the molded product.

A more comprehensive understanding of the invention can be obtained by referring to the following illustrative examples.

EXAMPLE 1

An urn using the molding composition of the present invention was made according to the following formula and procedure:

FORMULA

| Ingredient | Parts by Volume | Approximate Density (lbs/ft$^3$) |
| --- | --- | --- |
| casting plaster[1] | 1½ | 53–70 |
| white Portland cement | 1 | 94 |
| white sand - 20 mesh | ⅞ | 90–105 |
| mixture of water and water reducing agent[2] | 1½ | |

[1]Standard Casting Plaster manufactured by United States Gypsum, Chicago, Illinois.
[2]Darex Water Reducing Admixture, ASTM C-494 Type A, made by W. R. Grace Co.

1. The dry ingredients were added together and mixed so that a uniform molding compositio resulted.

2. The water reducing agent and water were mixed together in a volumetric ratio of 1:200 respectively.

3. The reducing agent-water combination was mixed together with the molding compositio so that a wet moldable mixture was obtained to produce a 7 inch slump.

4. The wet moldable mixture was poured into an open mold having a geometric sculptural relief pattern formed on its interior surfaces at room temperature, the interior surfaces of the mold first being lightly coated with oit. All portions of the mold were filled and the top of the molding composition was leveled.

5. After the wet mixture had remained in the mold for 30 minutes, the mold was disassembled and the hardened urn was removed therefrom.

6. The urn was allowed to cure for approximately 42 days.

7. Thereafter, the urn was loaded between parallel plates in a compression testing machine. A compressive load was applied until the sample yielded and the load was recorded. It was found that the urn yielded at 28,479 pounds of compressive force.

EXAMPLE 2

An identical urn was made according to the formula and procedure of EXAMPLE 1 except that 1 part of sand by volume was used, i.e. equal to the amount of Portland cement. Observation of the urn revealed that its corner and edge features were less sharply defined and much more irregular than those of the urn produced in EXAMPLE 1. It was found that the urn yielded at 16,929 pounds of force under the same compression test.

EXAMPLE 3

An identical urn was made according to the formula anf procedure of EXAMPLE 1 except that plaster of Paris was substituted for the standard casting plaster. Observation of the urn revealed that its corner and edge features were less sharply defind and much more irregular than those of the urn produced in EXAMPLE 1. It was found that the urn yielded at 10,979 pounds of force under the compression test.

The terms and expressions which have been employed in the foregoing abstract, specification and examples are used therein as terms of description and not of limitation, and there is no intention, in the use of such terms and expressions, of excludin equivalents of the features shown and described or portions thereof, it being recognized that the scope of the invention is defined and limited only by the claims which follow.

What is claimed is:

1. A molding composition in dry form consisting essentially of about one and one-half parts by volume of casting plaster containing at least 80% calcined gypsum with a particle size fine enough that all particles pass a No. 30 sieve and at least 90% pass a No. 100 sieve, about one part by volume of Portland cement, and about seven-eighths part by volume of sand with a mesh size in the range of 16 to 24 mesh.

2. A molding composition in dry form consisting essentially of about one and one-half parts by volume of casting plaster containing at least 80% calcined gypsum with a particle size fine enough that all particles pass a No. 30 sieve and at least 90% pass a No. 100 sieve, about one part by volume of Portland cement, about seven-eighths part by volume of sand with a mesh size in the range of 16 to 24 mesh, and about one-half to two parts by volume of fiberglass fibers having discontinuous lengths of about ¾-inch.

3. The molding composition of claim 2 additionally containing sufficient water to produce a standard 7-inch slump.

4. The molding compositio of claim 3 wherein the water contains a water-reducing agent and a liquid bonding agent for plaster and cement.

* * * * *

UNITED STATES PATENT AND TRADEMARK OFFICE
CERTIFICATE OF CORRECTION

PATENT NO. : 4,038,094
DATED : July 26, 1977
INVENTOR(S) : Herman H. Bondi

It is certified that error appears in the above-identified patent and that said Letters Patent are hereby corrected as shown below:

| | | |
|---|---|---|
| Col. 1, | line 4 | Change "Cross-Referece" to --Cross-Reference--; |
| | line 6 | Change "appliction" to --application--; |
| | line 8 | Change "abondoned" to --abandoned--; |
| | line 9 | Change "applicatio" to --application--; |
| | line 16 | Change "oher" to --other--. |
| Col. 3, | line 3 | After "cement," add the words --has demonstrated that the--; |
| | line 27 | Change "featurs" to --features--; |
| | line 39 | Change "shold" to --should--; |
| | line 55 | Change "proportios" to --proportions--. |
| Col. 4, | line 1 | Change "proportins" to --proportions--; |
| | line 1 | Change "he" to --the--; |
| | line 24 | Change "ingrediens" to --ingredients--; |
| | line 33 | Change "fo" to --of--; |
| | line 49 | Change "strenght" to --strength--; |
| | line 63 | Change "th" to --the--. |

UNITED STATES PATENT AND TRADEMARK OFFICE
CERTIFICATE OF CORRECTION

PATENT NO. : 4,038,094
DATED : July 26, 1977
INVENTOR(S) : Herman H. Bondi

It is certified that error appears in the above-identified patent and that said Letters Patent are hereby corrected as shown below:

Page 2 of 2

Col. 5, line 2   Change "inaddition" to --in addition--;

line 33   Change "compositio" to --composition--;

line 37   Change "compositio" to --composition--;

line 44   Change "oit" to --oil--.

Col. 6, line 15   Change "anf" to --and--;

line 26   Change "excludin" to --excluding--;

line 52   Change "compositio" to --composition--.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*